(No Model.)
F. J. PATTEN.
GENERATION AND DISTRIBUTION OF ELECTRIC CURRENTS.
No. 418,652. Patented Dec. 31, 1889.
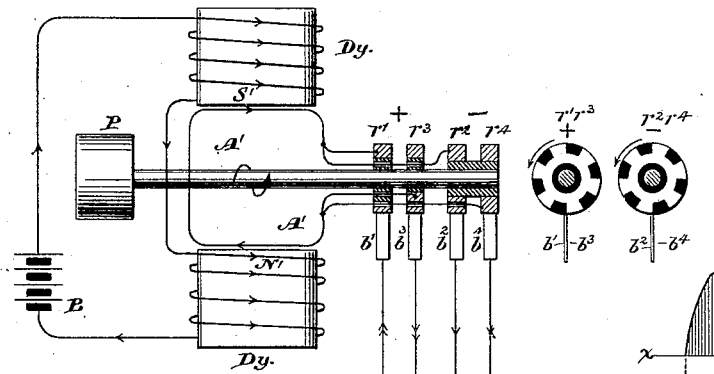
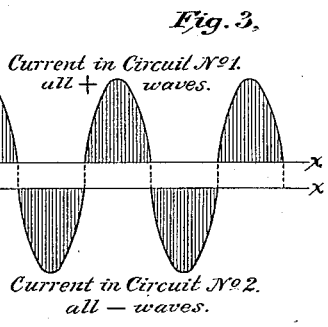
Fig. 3.
Current in Circuit Nº 1.
all + waves.
Current in Circuit Nº 2.
all − waves.
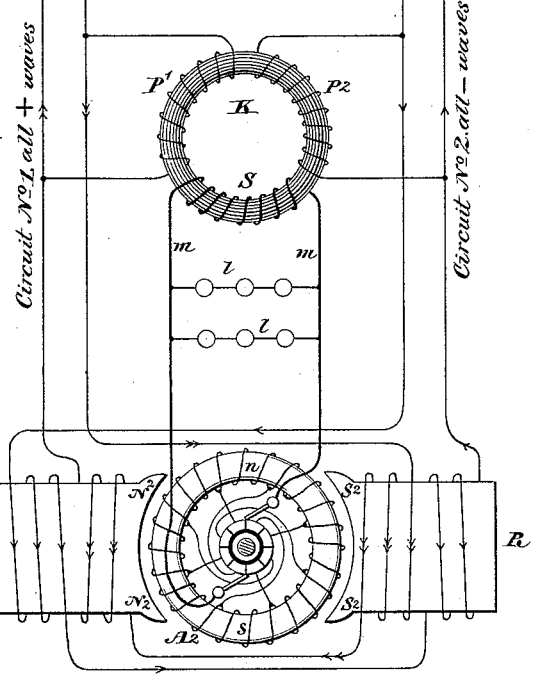
Fig. 1,
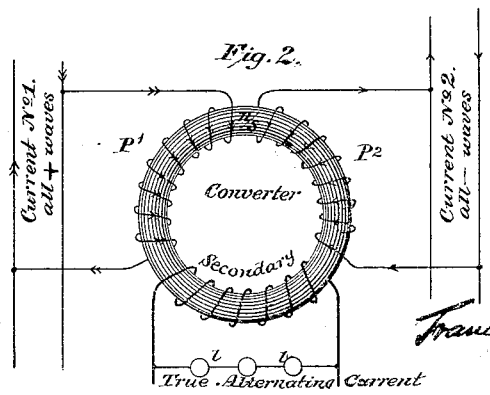
Fig. 2.
Witnesses
Geo. W. Breck
W. M. Miner
Inventor
Francis James Patten

UNITED STATES PATENT OFFICE.

FRANCIS JARVIS PATTEN, OF NEW YORK, N. Y.

GENERATION AND DISTRIBUTION OF ELECTRIC CURRENTS.

SPECIFICATION forming part of Letters Patent No. 418,652, dated December 31, 1889.

Application filed November 9, 1889. Serial No. 329,775. (No model.)

*To all whom it may concern:*

Be it known that I, FRANCIS JARVIS PATTEN, a citizen of the United States, residing in the city of New York, in the county and State of New York, have invented certain new and useful Improvements in the Method of Generation and Distribution of Electric Currents and Apparatus therefor, of which the following is a description.

Referring to the drawings, Figure 1 is a general view of the system, showing the method of generation and distribution. Fig. 2 is a novel form of a converter or transformer, and Fig. 3 illustrates the different current phases in the different circuits.

The entire system is shown by a diagram of the operative parts and circuits in Fig. 1.

D$y$ represents a dynamo for generating electric currents, and is of the most general form. It is neither a direct current nor, strictly speaking, an alternating-current machine.

The field-magnet poles are indicated by N' S', and their circuits may have a separate source of excitation, and there may be any even number of them. The armature A' A' may have any number of coils or loops connected in series or parallel with each other, and the terminals of this armature-circuit are taken to two pairs of sliding ring-contacts. The single armature-loop shown may therefore represent any series armature the terminals of which are connected in the manner shown.

The armature-coil has two independent pairs of terminals, one pair ending in the rings $r'$ $r^3$, the other pair ending in the rings $r^2$ $r^4$. On these rings bear the four brushes $b'$, $b^3$, $b^2$, and $b^4$, from which two independent circuits M' M$^2$ are taken to any distant point desired. I thus have in general a four-wire system of distribution. The rings are not continuous conductors, but have their surfaces broken by insulating-segments, as shown in the projections to the right of the machine. In each ring half of the surface is conducting and the other half non-conducting material, and they are so fixed upon the spindle of the machine that the conducting parts in one pair of rings correspond exactly in position to the insulated portions of the other. It will therefore be evident that with the four brushes placed on the same line the two main circuits M' M$^2$ will receive current from the machine alternately, one circuit being dead or an open circuit while the other is closed, this recurring in rapid alternation as the armature revolves. In each pair of rings there are as many insulating-segments as there are poles in the machine, from which it results that all the positive or plus impulses or waves of current will go out on one of the main circuits and all the negative impulses or waves of current will go to the other, and I will thus have in each circuit an intermittent current. Thus, referring to Fig. 3, one circuit—as the main M'—will receive all the positive waves of current, as indicated by the shaded spaces above the line X X, and the other circuit will have all the intermediate negative waves shown in effect and in time position by the shaded spaces below the lines X X. It will thus be seen that the true character of the alternating current has not been changed, but the connections are so made that all the positive waves go to one circuit and all the negative waves to the other. Having currents of opposite polarity thus separated, any desired combination of the two to produce either a direct or true alternating current may be made at a distance from the dynamo. Thus at some outlying point a converter, like that shown in Fig. 2 and which forms a special feature of this invention, may be used to reassemble the divided current and produce a true alternating current, or, as shown in Fig. 1, circuits may be taken from the mains themselves and combined in such a way as to produce in a mass of iron the same effect as would a direct current.

Fig. 2 represents the special form of converter used. It has a closed magnetic circuit, upon which are wound two primary coils and one secondary. One of these primary coils (indicated by P') is connected to the main conveying plus waves of current, and the other (indicated by P$^2$) is connected with the mains conveying minus waves of current, and as these waves are periodic and intermittent, following each other in succession, the resultant effect on the converter of the two primaries is the same as would be produced by a single primary supplied with a true alternating current, and therefore a true alternating current will flow in the secondary circuit of this converter as in the ordinary form.

The system of distribution shown in Fig. 1 will now be understood. In the secondary circuit of the transformer I may place lamps or other devices requiring a low-tension alternating current, or the armature of a motor in which constant armature polarity is produced by an alternating current, on the method shown in a former patent granted me, No. 410,987, of September 10, 1889. Such a motor, like many other forms, requires a field of constant polarity, and this may be obtained from the main circuits, as follows: A circuit is taken from the mains M' and wound upon the fields, as shown, producing by its intermittent positive impulses the polarity N S, and from the mains $M^2$ a circuit is also wound upon the field in the opposite direction from the first, so that in this case the negative impulses produce the same polarity.

It will thus be seen that by a suitable combination of circuits taken from the two mains I may produce at any distant point the effects of a direct current as well as those of an alternating current, as previously shown. I therefore have combined in this system of distribution the advantages of both direct and alternating systems.

Having thus described my invention, what I claim, and desire to secure by Letters Patent, is—

1. An alternating dynamo-electric generator having two complete independent external main circuits conveying, respectively, the impulses of opposite polarity of the alternating current, and suitable commutator devices for connecting said circuits to the generating-circuit of the machine, whereby all impulses of one polarity are caused to traverse one external circuit, and all impulses of opposite polarity are caused to traverse the other external circuit.

2. The method of electrical distribution from an alternating current-generator, which consists in conducting from the same generator all impulses of one polarity through one external circuit and all impulses of opposite polarity through another external circuit, and producing by such currents used conjointly an uninterrupted alternating current in the secondary circuit of a transformer.

3. The method of electrical distribution, which consists in conducting from an alternating-current generator all impulses of one polarity into one external circuit and all impulses of opposite polarity into another external circuit, producing by such currents an uninterrupted alternating current in the secondary circuit of a transformer and connecting in said secondary circuit devices requiring an alternating current.

4. The improved method of electrical distribution from an alternating-current generator, which consists in conducting from the generator all impulses of like polarity through one complete independent external circuit and all impulses of opposite polarity through another external circuit, and applying said circuits conjointly, but in a reverse sense, to translating devices requiring current of one direction.

5. An alternating-current transformer having two primary inducing-circuits connected to separate leads, which conveys, respectively, the opposite impulses of the same alternating current.

6. An alternating-current electric generator provided with an armature having four terminals connected to four separate ring-contacts, which contacts have insulated segments, whereby the generating-circuit is connected alternately and in succession to each of two external circuits.

In testimony whereof I have hereunto subscribed my name.

FRANCIS JARVIS PATTEN.

Witnesses:
EDWARD C. DAVIDSON,
MAMIE J. KELLEY.